Nov. 18, 1958   H. W. VOGL   2,860,553
AUTOMATIC DEVICE FOR THE MANUFACTURE OF PARCEL CARRIERS
Filed Nov. 9, 1954   9 Sheets-Sheet 1

INVENTOR
HUGH W. VOGL

Nov. 18, 1958 H. W. VOGL 2,860,553
AUTOMATIC DEVICE FOR THE MANUFACTURE OF PARCEL CARRIERS
Filed Nov. 9, 1954 9 Sheets-Sheet 2

INVENTOR.
Hugh W Vogl
BY John F. Brezina
Attorney

Nov. 18, 1958     H. W. VOGL     2,860,553
AUTOMATIC DEVICE FOR THE MANUFACTURE OF PARCEL CARRIERS
Filed Nov. 9, 1954     9 Sheets-Sheet 3

INVENTOR
Hugh W. Vogl
BY John F. Brezina

Nov. 18, 1958 H. W. VOGL 2,860,553
AUTOMATIC DEVICE FOR THE MANUFACTURE OF PARCEL CARRIERS
Filed Nov. 9, 1954 9 Sheets-Sheet 4

INVENTOR
Hugh W. Vogl
BY John F. Brezina

Nov. 18, 1958     H. W. VOGL     2,860,553
AUTOMATIC DEVICE FOR THE MANUFACTURE OF PARCEL CARRIERS
Filed Nov. 9, 1954     9 Sheets-Sheet 5
FIG. 6
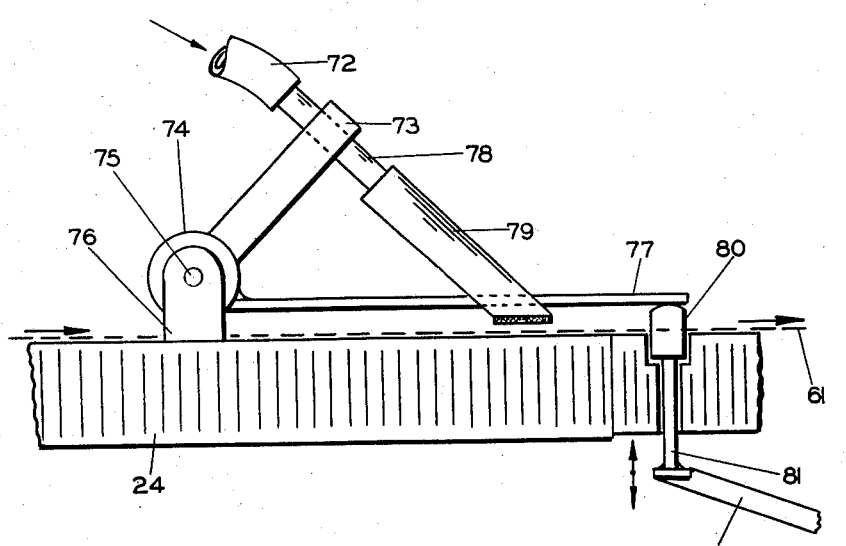
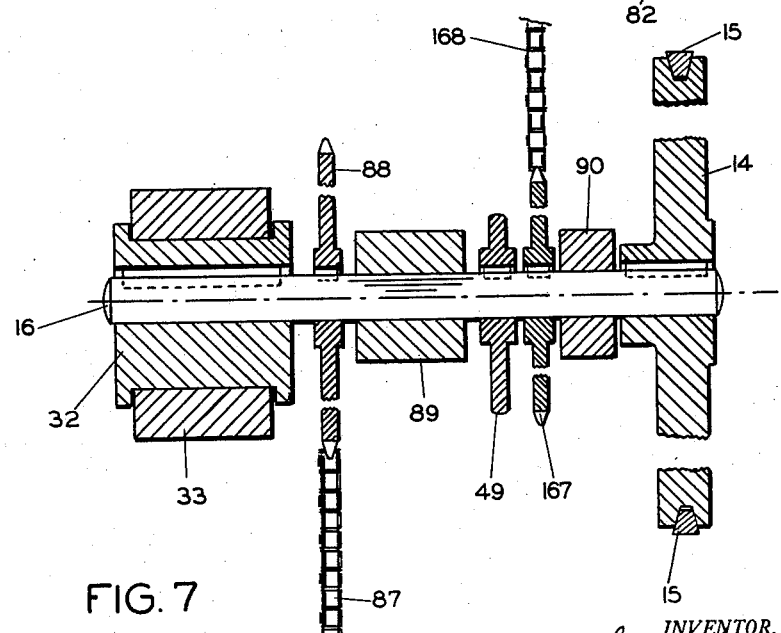
FIG. 7
INVENTOR
Hugh W. Vogl
BY John F. Brezina Nov. 18, 1958  H. W. VOGL  2,860,553
AUTOMATIC DEVICE FOR THE MANUFACTURE OF PARCEL CARRIERS
Filed Nov. 9, 1954  9 Sheets-Sheet 6

INVENTOR.
Hugh W. Vogl
BY John F. Brezina
Attorney

Nov. 18, 1958  H. W. VOGL  2,860,553
AUTOMATIC DEVICE FOR THE MANUFACTURE OF PARCEL CARRIERS
Filed Nov. 9, 1954  9 Sheets-Sheet 7

INVENTOR.
Hugh W. Vogl
BY John F. Brezina
Attorney

Nov. 18, 1958 H. W. VOGL 2,860,553
AUTOMATIC DEVICE FOR THE MANUFACTURE OF PARCEL CARRIERS
Filed Nov. 9, 1954 9 Sheets-Sheet 8

INVENTOR
Hugh W. Vogl
BY John F. Brezina
Attorney

Nov. 18, 1958 H. W. VOGL 2,860,553
AUTOMATIC DEVICE FOR THE MANUFACTURE OF PARCEL CARRIERS
Filed Nov. 9, 1954

INVENTOR.
Hugh W. Vogl

United States Patent Office 2,860,553
Patented Nov. 18, 1958

2,860,553

AUTOMATIC DEVICE FOR THE MANUFACTURE OF PARCEL CARRIERS

Hugh W. Vogl, Chicago, Ill.

Application November 9, 1954, Serial No. 467,712

6 Claims. (Cl. 93—1)

This invention relates to a device for the manufacture of parcel carriers. Particularly it relates to a device for the continuous manufacture of connected severable parcel carriers having looped handles.

The parcel carriers manufactured by the device with which the present invention is concerned comprise an elongated severable tape which has one surface thereof gummed or coated with adhesive for the purpose of connecting the tape to the parcel to be carried. The tape in its original form comes in rolls and has continuously affixed thereto looped handles in the device with which the instant invention is concerned. Thereafter the connected, completed parcel carriers are collected on spools in rolls for distribution. From the completed rolls of parcel carriers, an end user may sever selected lengths thereof for use.

During the course of the operation and assembly performed in the device with which this invention is concerned, the paper tape, and the ribbon that forms the parcel carrier handles are intermittently stopped to permit the connection of the components comprising the completed parcel carriers. The ribbon and the tape together with reinforcing strips are continuously fed into the device with which the instant invention is concerned, and the completed parcel carriers are continuously removed from said device and wound in a roll on a spool. Because the feed into the device of the components of the carrier and the removal from the device of the finished parcel carriers is continuous, it is of importance that suitable means provide for the integration of the operation to permit uninterrupted manufacture even though the machine intermittently stops the tape, ribbon and reinforcing strips for the purpose of assembly thereof into the completed carriers.

In previous devices of the class described one of the primary problems was coordinating and adjusting the continuous ribbon feed into such devices with the rate at which the tape was progressing through such devices. Variables for which adjustment must be made and for which compensating means are required include such things as the minute variations in the thickness of the ribbon for which compensation must be made in order to avoid tangling of the ribbon. Additionally, a similar problem was present with regard to the reinforcing strips that reinforced the edges of the apertures through which the ribbon extended through the tape to form the looped handles.

Further, it is exceedingly desirable to have all of the operable parts easily accessible, especially those directly responsible for the feed-in of the various components of the finished parcel carriers and the elements responsible for the actual assembly of the various components of the finished parcel carriers.

Furthermore, in order to reduce the cost of the finished parcel carriers it is desirable to increase the speed of production thereof by increasing the speed of the assembly operation over speeds that are achieved by devices currently being used for the manufacture of parcel carriers of the class described.

It is an object of this invention to provide a device for the manufacture of parcel carriers comprising a severable tape having a ribbon affixed thereto, portions of said ribbon extending through the tape to provide handles, said tape and ribbon being severable to provide parcel carriers of selected lengths.

It is further an object of this invention to provide a device for the manufacture of parcel carriers of the class described having means for continuously feeding the ribbon into the device, means for continuously feeding a tape into the device, and means for continuously removing the assembled parcel carriers in a roll.

It is a yet further object of this invention to provide a device for the manufacture of parcel carriers of the class described, characterized by the fact that all of the component elements of the device directly engaged in the assembly of the parcel carriers and in the feed-in of the respective elements thereof are easily accessible.

It is a still further object of this invention to provide a device, for the manufacture of parcel carriers, of the class described in which there is provided an improved means for synchronizing the feed-in and adjusting for variation in size of the ribbon forming the handles of the parcel carriers with the speed of the tape being drawn through the device.

Additionally, it is an object of this invention to provide a device, for the manufacture of parcel carriers, of the class described having improved means for punching the ribbon through the tape to form the parcel carrier handles, thereby permitting increased speed in the assembly of the parcel carriers over conventional devices now used.

Other and further objects of this invention will become apparent from the following description and appended claims, reference being had to the accompanying drawings and numerals of reference thereon.

On the drawings:

Fig. 6 is an enlarged detail view in elevation, of the mechanism for intermittently applying water to the fed tape.

Fig. 7 is a view taken substantially on the line 7—7 of Fig. 3, and looking in the direction of the arrows.

Figure 1:
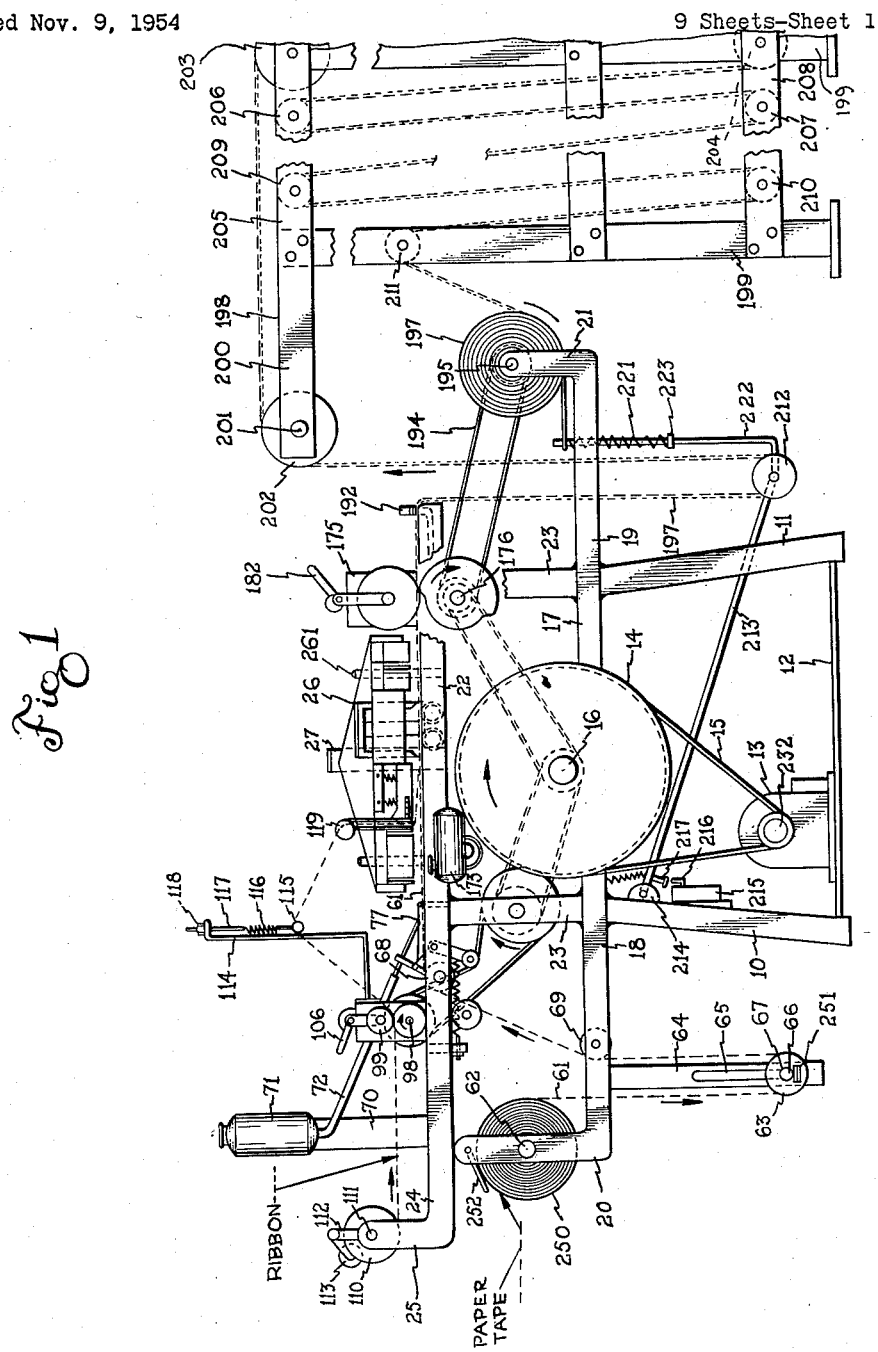
Fig. 1 is a side elevational view of a device embodying one form of the invention.

Referring now more particularly to the drawings, the instant device includes a rigid frame generally designated by the numeral 10. The frame 10 is provided with a plurality of supports or legs 11 between which there is shown secured in Figs. 1 and 2 a motor support or base 12 on the upper surface of a prime mover means which is illustrated in general form as motor 13. A pulley 232 mounted on the shaft of the motor 13 transmits the force of the motor 13 to fly-wheel 14 through belt 15. The fly-wheel 14 is secured on one end of a transversely extending shaft 16, illustrated in Figs. 1, 2, 3, and 7. As illustrated in Fig. 7, the shaft 16 is journalled in a pair of journalling blocks 89 and 90, which are supported on the frame 10 in any suitable fashion or by any suitable means.

Figure 2:
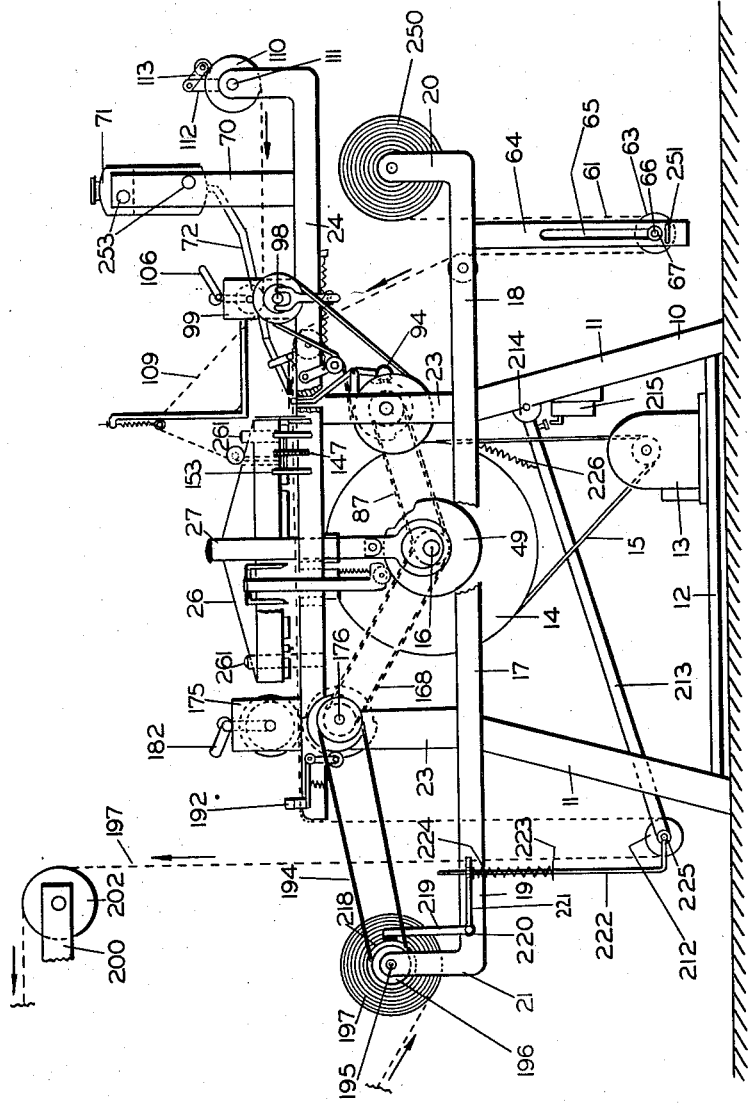
Fig. 2 is an elevational view of the device taken from the side opposite that illustrated in Fig. 1.

Frame 10 includes an elongated horizontally extending platform 17 rigidly positioned on the legs 11, and said platform 17 has a rearwardly extending extension 18 and a forwardly extending extension 19 as illustrated in Figs. 1 and 2. Extension 18 has an upwardly extending arm 20, and extension 19 has an upwardly extending arm 21.

A horizontally disposed table 22 is mounted above the platform 17, and is rigidly supported in such position by means of a plurality of supports or depending frame members 23. The table 22 is provided with a rearward extension 24 that has an upwardly extending arm 25, illustrated in Figs. 1 and 2.

Figure 3:
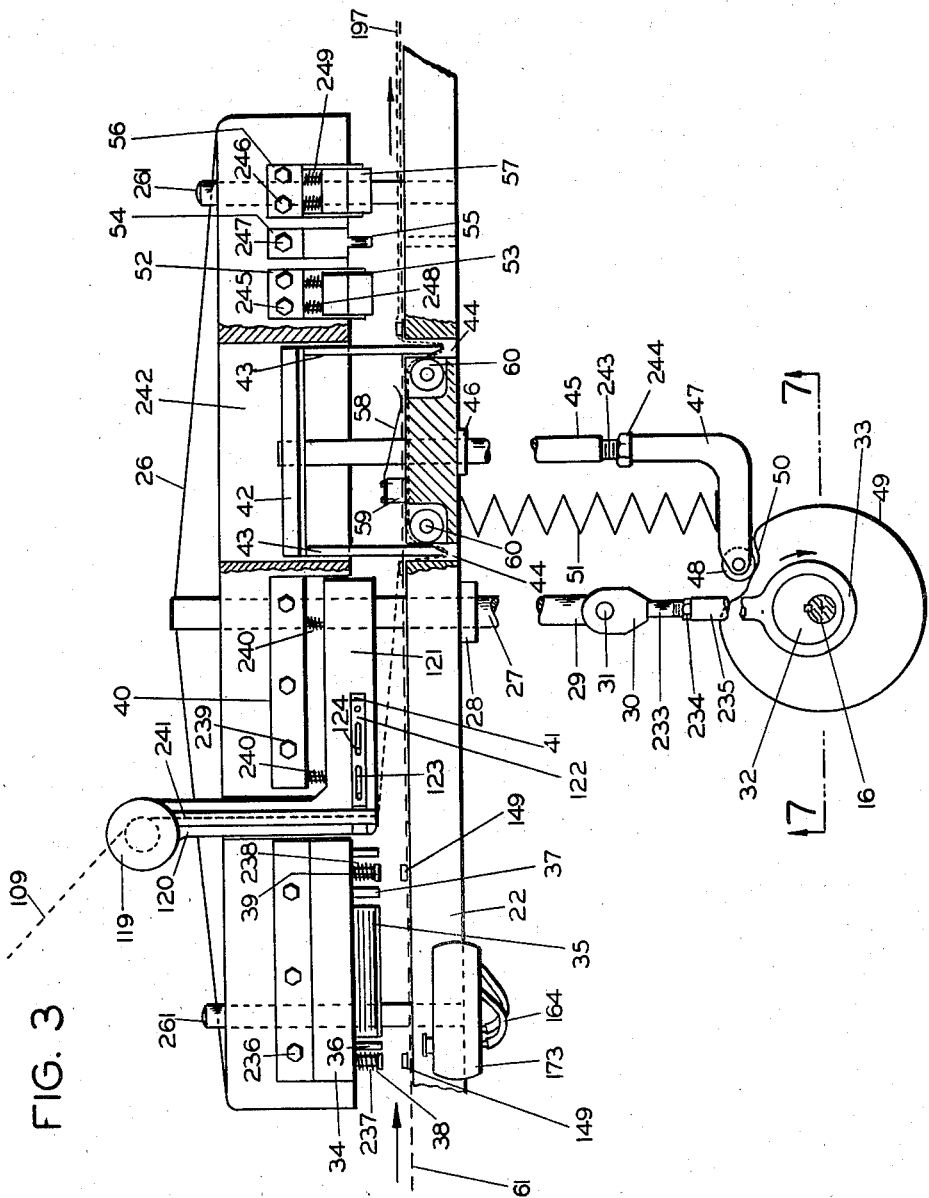
Fig. 3 is an enlarged detail view in elevation of the reciprocating head, illustrating the means for causing reciprocation thereof, parts being broken away for the purpose of illustration.

A reciprocating head or tool holder 26, clearly illustrated in Figs. 1, 2, and 3 is operably connected to the shaft 16. Said head 26 is carried on a shaft 27 to which it is secured. Shaft 27 is journalled in a journalling element 28 secured on table 22, as illustrated in Fig. 3. The lower end 29 of shaft 27 is pivoted between the ears of a link or bracket 30 by means of a pin 31. The link 30 has a depending stem 233, the lower end of which is threaded, as illustrated in Fig. 3. A lock nut 234 secures the stem 233 in adjusted positions to an upwardly extending internally threaded boss 235, as illustrated in Fig. 3. Boss 235 is shown integral with a ring 33 in which there is journalled a disc 32 that is secured eccentrically on the shaft 16 as illustrated in Fig. 3. As head 26 reciprocates it is guided by a plurality of suitably disposed guide pins 26, the lower ends of which are secured to table 22.

Figures 14, 15, 16, 17:
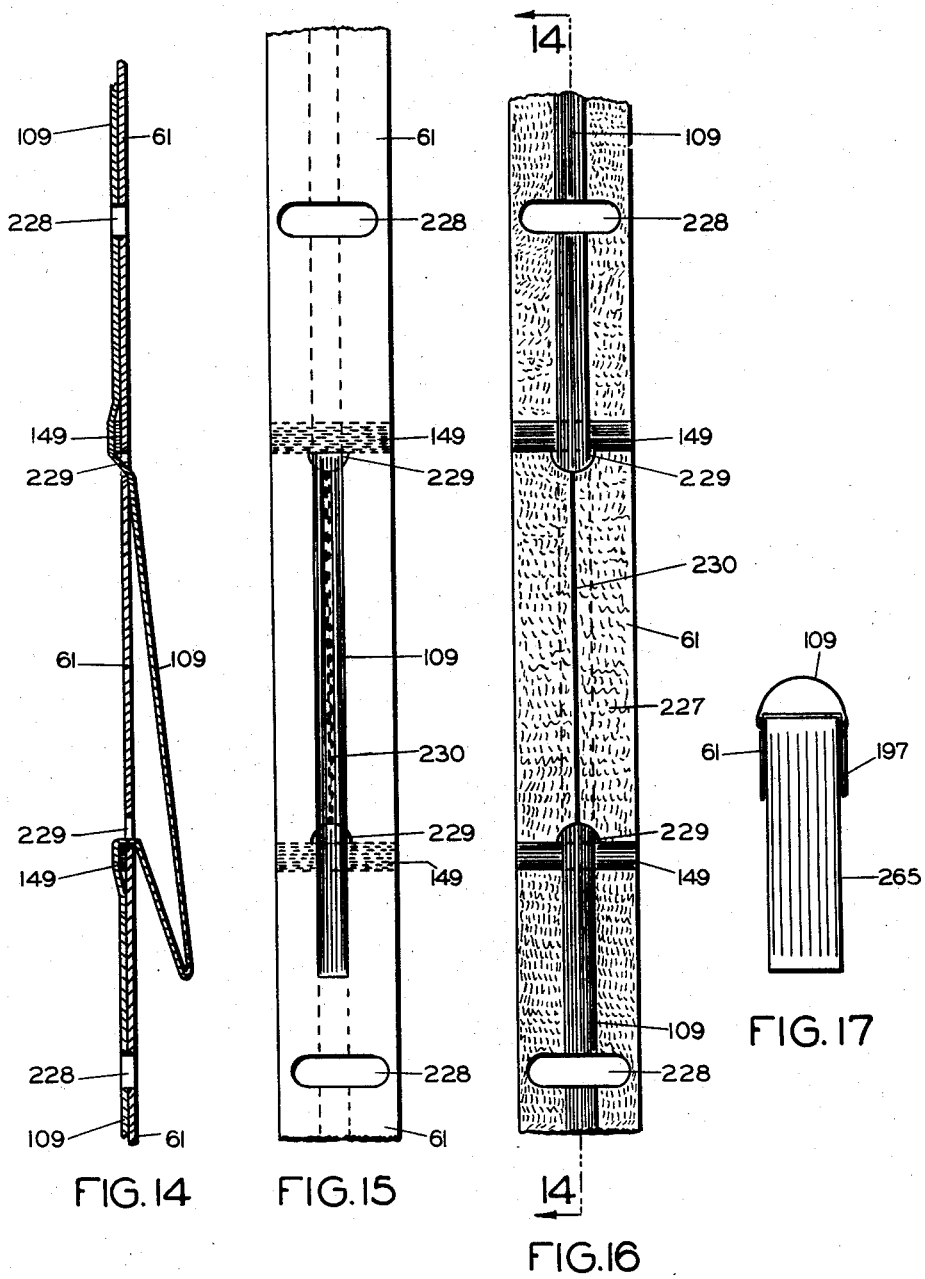
Fig. 14 is a view taken substantially on the line 14—14 of Fig. 16.
Fig. 15 is a plan view of a segment of the assembled parcel carriers.
Fig. 16 is a view looking at the surface of the segment of parcel carriers.
Fig. 17 is an illustration of a selected length of parcel carrier in use.

A casting 34 is secured to the outside surface of head 26 by means of a plurality of fasteners such as screws or the like 236. The casting 34 carries an elongated, depending, rigid cutting die 35 that cuts the elongated slit 230 which is clearly illustrated in Fig. 16. The casting 34 also carries a pair of rigid, depending punches 36 and 37 adjacent opposite ends of the die 35. Punches 36 and 37 create the apertures 229 at opposite ends of slit 230 said apertures 229 being illustrated in Figs. 14, 15 and 16. The casting 34 also carries a pair of depending yieldable spaced apart presser feet 38 and 39 that are yieldably held in extended positions by means of springs 237 and 238 respectively. The presser feet 38 and 39 cause the engagement of severed segments of reinforcing strips 149 adjacent opposite apertures 229, as illustrated in Figs. 14, 15 and 16. By removing the screws 236 the casting 34 and all of the elements carried thereon can be disassembled and removed easily and quickly from the head 26.

A second casting 40 is secured to the head 26 by means of fasteners such as screws or the like 239. The casting 40 is spaced from the casting 34 to provide between casting 39 and 40 a track in which the vertically extending portion of a ribbon guide 120 is slidably retained. The ribbon guide 120 has a horizontally extending portion 121 which is yieldingly connected to casting 40, and it is held in extended position by means of a pair of springs 240, as illustrated in Fig. 3. A wheel 119 is rotatably mounted at the upper end of guide 120 and said wheel 119 facilitates the continuous entrance of ribbon 109 into the track 241 in the ribbon guide 120. As the head 26 reciprocates the horizontal or clamp portion 121 of the ribbon guide 120 intermittently clamps successive portions of the ribbon 109 against the gummed surface 227 of the tape 61.

The horizontal or clamp portion 121 of ribbon guide 120 has provided therein an elongated slot 41 which is communcatively connected with the track 241. Said slot 41 has slidably mounted therein a plate 122 which is adapted to cover the lower end of track 24. The plate 122 is adjustable within the range of the slots 123 provided therein, pins 124 limiting the movement of the plate 122. The foregoing arrangement provides access to track 241 for adjusting the ribbon 109 should it become twisted or entangled therewithin.

A fork 42 comprising a pair of depending prongs or tines 43 is slidably mounted in a side recess 242 provided in the head 26. The prongs 43 are extendable through spaced apertures 44 in the table 22 as illustrated in Fig. 3. The prongs 43 intermittently push sections of the ribbon 109 through the slit 230 at the apertures 229 that are formed by the punches 36 and 37, as illustrated in Fig. 3. Each time the prongs 43 descend they pull sufficient of the ribbon 109 to form a loop for a handle as illustrated in Figs. 14, 15, 16, and 17. A pair of bearing wheels 60 are journalled in openings provided in the table 22 adjacent the apertures 44, as illustrated in Fig. 3. A flat, adjustable tension spring 58 bears on the ribbon 109 and provides a resistance whereby drawing in to the assembly operation of too much ribbon is precluded by the sudden plunge of fork 42. One end of the spring 58 is secured on a block 59 secured on the top of table 22.

The fork 42 is securely connected to the upper end of a shaft 45 that reciprocates in the bearing 46 secured on the frame. The lower end 243 of the shaft 45 is threaded and is adjustably secured in an internally threaded arm 47 by means of a nut 244 as illustrated in Fig. 3. The arm 47 is shown bent in a substantially right angle, and at the outer end thereof a wheel 48 is journalled. The wheel 48 bears against the surface of cam 49 which is securely mounted on the shaft 16. A recess 50 is provided in the outer rim of cam 49. As the wheel 48 engages in said recess, a compression spring 51, which bears against arm 47 and the table 22, as illustrated in Fig. 3, urges the shaft 45 downwardly causing the prongs 43 to descend into the apertures 44 carrying the ribbon 109 therewith as illustrated in Fig. 3.

A casting 52 mounted on the side of the head 26 is releasably secured thereto by means of fasteners, such as screws or the like 245. A casting 56 horizontally spaced from casting 52 is secured to the head 26 by means of fasteners, such as screws or the like 246. Castings 52 and 56 have mounted thereon yieldable presser feet or clamps 53 and 57 respectively, the clamp 53 being yieldable as a result of the action of springs 248 and the clamp 57 being yieldable by virtue of the action of springs 249. As the head 26 intermittently moves downwardly, clamps 53 and 57 intermittently engage against the assembled parcel carrier and punch 55 cuts perforation 228 and through the tape 61 and the ribbon 109, as illustrated in Figs. 14, 15 and 16. The punch 55 is disposed between the clamps 53 and 57, and said punch is carried on a casting 54 which is secured to the side of the head between castings 52 and 56 by means of fasteners, such as screws or the like 247, as illustrated in Fig. 3.

The paper tape 61 that is fed into the assembly operation in the device in the formation of the parcel carrier has one surface 227 thereof coated with adhesive. A roll 250 of the paper tape 61 is mounted on a pin 62 that is journalled in arm 20. The tape 61 is fed on to the surface of table 22 with its gummed side facing upwardly.

A spool 63 that is secured on a pin 66 is mounted between a pair of depending arms 64 having elongated vertical slots 65 respectively so that the pin extends through and is elevatable within the limits of the said slots. Said slots 65 are substantially parallel to each other and of equal lengths. A pair of flanges 67 are mounted on opposite ends of the pin 66 and retain said pin in the slots 65. A compressible boss or pad 251 is secured to the outer surface of each of the arms 64, and they provide a soft abutment for the flanges 67.

A roller 69 is rotatably secured on the extension 18 of the platform 17; and a roller 68 is rotatably secured on the extension 24 of table 22, as illustrated in Fig. 1. The paper tape 61 is guided through the spool 63 and the rollers 69 and 68 to its position of entry on to a surface of table 22 as illustrated in dotted lines in Figs. 1 and 2.

As the paper tape 61 is intermittently drawn across the surface of the table 22, the spool 63 bobs up and down substantially within the limits of the slots 65. The intermittent pulling of the paper tape 61, however, tends to create a continuous unwinding effect on roll 250 and to additionally compensate therefor, so that too much tape 61 is not unwound, a brake 252 is pivoted to the arm 20 and rests against the roll 250, as illustrated in Fig. 1. The brake 252 may be a plate of wood, for example, or of other suitable construction.

An upwardly extending arm 70 has its lower end rigidly secured to the extension 24 of the table 22, as illustrated in Figs. 1 and 2. A water reservoir 71 is mounted on arm 70 by means of suitable fastening elements 253, illustrated in Fig. 2. A flexible conduit 72 communicatively connects the reservoir 71 with a fitting 78 that is communicatively connected with an applicator 79, as illustrated in Fig. 6. The applicator 79, as it engages the gummed surface 227 of tape 61, wets the gummed tape with water from the reservoir 71. The fitting 78 is secured in a stem 73 that is carried on a cylinder 74. The cylinder 74 is rigidly secured to a pin 75 that is journalled in a bracket 76 that is rigidly mounted on extension 24, as illustrated in Fig. 6. The cylinder 74 also has secured thereto or carries an outwardly extending arm 77 that engages a bobbing plug 80. The plug 90 is secured to the upper end of an arm 81 that extends upwardly through extension 24 in the table 22, as illustrated in Fig. 6. As the arm 81 moves upwardly, applicator 79 is disengaged from the surface 227 of the paper tape 61. As the arm 81 moves downwardly an elongated strip of the gummed surface 227 of paper tape 61 is wetted as the paper tape 61 is drawn under the applicator 79.

Figure 9:
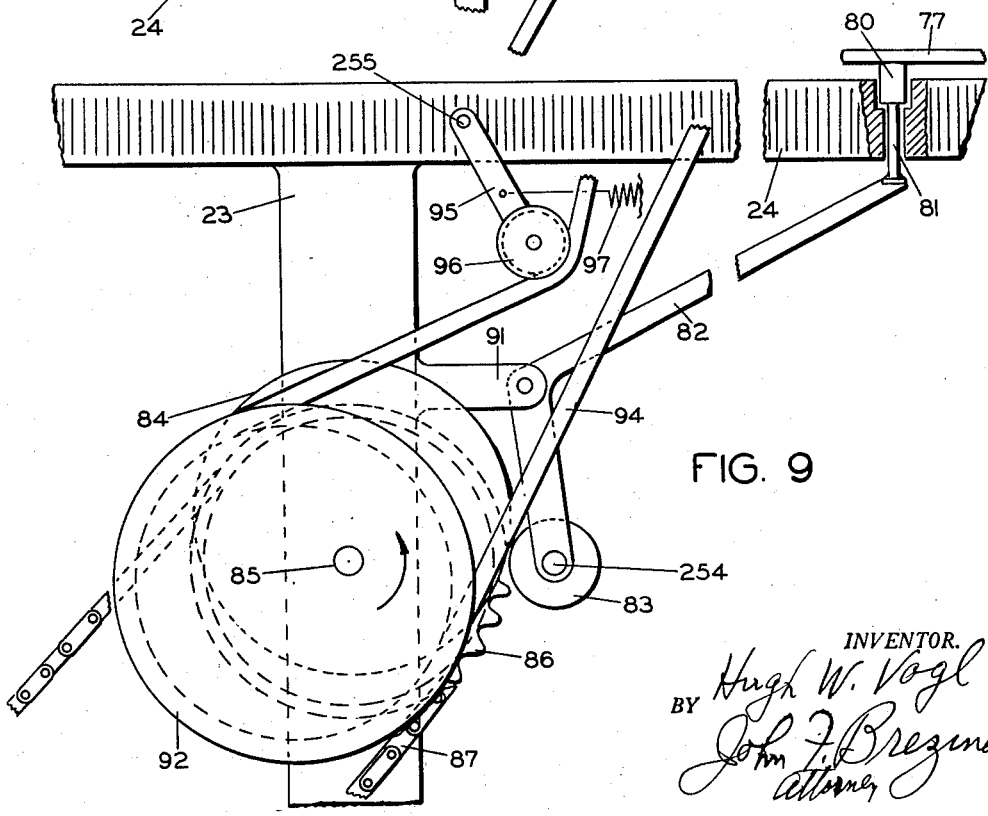
Fig. 9 is an enlarged detail view in elevation, of the power transmission means to the ribbon feeding mechanism illustrated in Fig. 8 and the water applying mechanism illustrated in Fig. 6.

To operate the water applying components, a sprocket 88, illustrated in Fig. 7, is secured on the shaft 16. A chain 87 transmits the rotational force of sprocket 88 to a sprocket 86 which is secured on a shaft 85 journalled in one of the supports 23, as illustrated in Fig. 9. The rotating shaft 85 has secured thereon an eccentrically mounted disc 84, the surface of which is engaged by a wheel 83 which is secured on a pin 254. The pin 254 is rotatably mounted in the depending end of an angularly bent lever 82. The lever 82 is pivoted to an ear 91 that extends outwardly from the support 23, as illustrated in Fig. 9. The upper end of the lever 82 is operably connected to the lower end of the arm 82. Thereby, as the disc 84 rotates, arm 81 is moved upwardly and downwardly.

Figure 8:
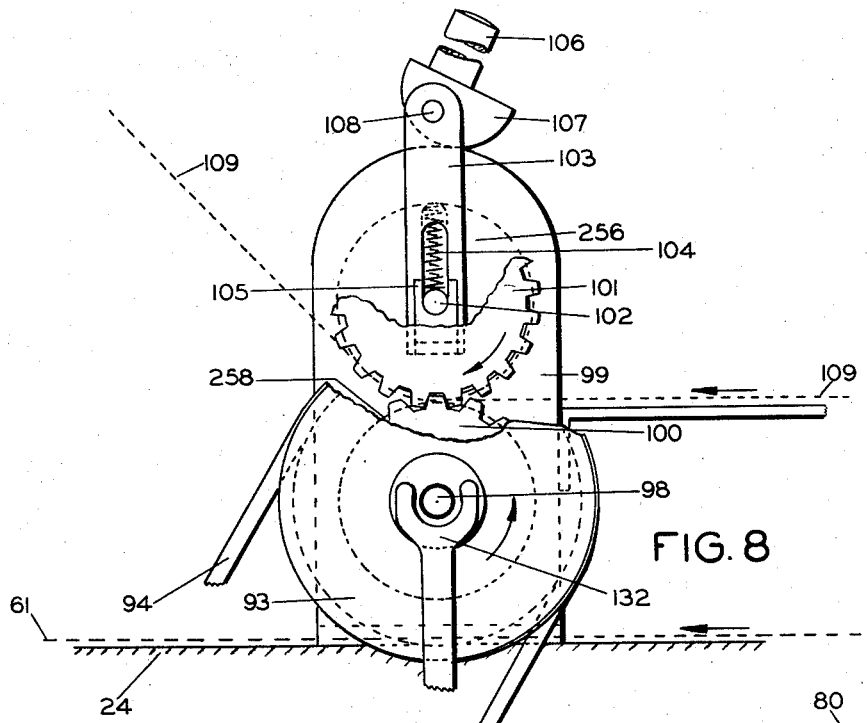
Fig. 8 is an enlarged detail view in elevation, of the mechanism for feeding the ribbon, parts being broken away for the purpose of illustration.

An eccentrically mounted pulley 92 is also secured on the shaft 85, as illustrated in Fig. 9. Said pulley transmits its varying rotational force to a pulley 93 carried on a shaft 98, illustrated in Fig. 8, by means of belt 94, illustrated in Figs. 8 and 9. The shaft 98 is journalled in an upwardly extending block 99 that is rigidly secured on the extension 24, as illustrated in Figs. 1, 2 and 8. To maintain the tension on the belt 94, an arm 95 is pivoted on a pin 255 that is secured to extension 24. A tension spring 97 is connected to said arm 95 and to the frame 10, as illustrated in Fig. 9, grooved wheel 96 is carried in the end of the arm 95 and it is drawn against the belt 94, as illustrated in Fig. 9, under action of said spring 97.

A gear 100 is secured to the shaft 98, as illustrated in Fig. 8. Said gear 100 transmits the rotational force of the shaft 98 to a gear 101 that is secured on a shaft 102 which is vertically spaced from the shaft 98. The shaft 102 has secured thereon a wheel 256 with an annular lip (not shown). The shaft 98 has secured thereon a wheel 257 with an annular groove (not shown). The rim of the wheel 256 engages in the groove of the wheel 258 to pull the ribbon 109, as illustrated in Fig. 8, from the ribbon spool 110 illustrated in Figs. 1 and 2, with varying degrees of force. The direction of the path of the ribbon is shown by the arrow in Fig. 8.

A bifurcated arm 103 is slidably mounted in the block 99 as illustrated in Fig. 8. The shaft 102 is journalled in a bearing 105. A compression spring 104 at its lower end bears against bearing 105. The upper end of the spring 104 bears against the block 99. A rounded boss 107 is secured on a pin 108 which also carries the slidable arm 103. A handle 106 is rigidly secured to boss 107. As the handle 106 is moved downwardly the slidable arm 103, the shaft 102 and wheel 256 carried on shaft 102, will be moved upwardly to disengaged ribbon 109 from between the wheels 256 and 257.

The spool 110 of ribbon 109 is carried on a pin 111 that is secured in arm 25 as illustrated in Figs. 1 and 2. An upwardly extending arm 112 has pivoted thereto a brake 113 for the purpose of breaking the tendency of spool 110 to continuously rotate. An angularly bent upwardly extending arm 114 is suitably secured in the position illustrated in Figs. 1 and 2. An elongated pin 117 extends through an aperture in the end of arm 114. A boss 118 is secured to the pin 117 above the arm 114 and limits the downward movement of said pin 117. At its lower end, the pin 117 is connected to a spring 116, the lower end of which provides an eyelet 115 as illustrated in Fig. 1.

The ribbon 109 is fed from the spool or roll 110 between the wheels 256 and 258 through the eyelet 115 over the roller 119 and into the ribbon guide 120 which was heretofore described in connection with the detailed description of Fig. 3.

The shape of the cam 92, clearly illustrated in Fig. 9 and the spring 116 are designed to intermittently draw only the amount of ribbon required in the assembly of the parcel carriers. However, minute variations in the thickness of the ribbon or the relationship between the thickness of the ribbon 109 and the tape 61 result in disproportionate amounts of tape and ribbon being fed into the device, and as a consequence an additionally fine adjustment must be provided in order to permit uninterrupted operation of the device so that the ribbon 109 is fed to the device at the precise rate required.

Figure 10:
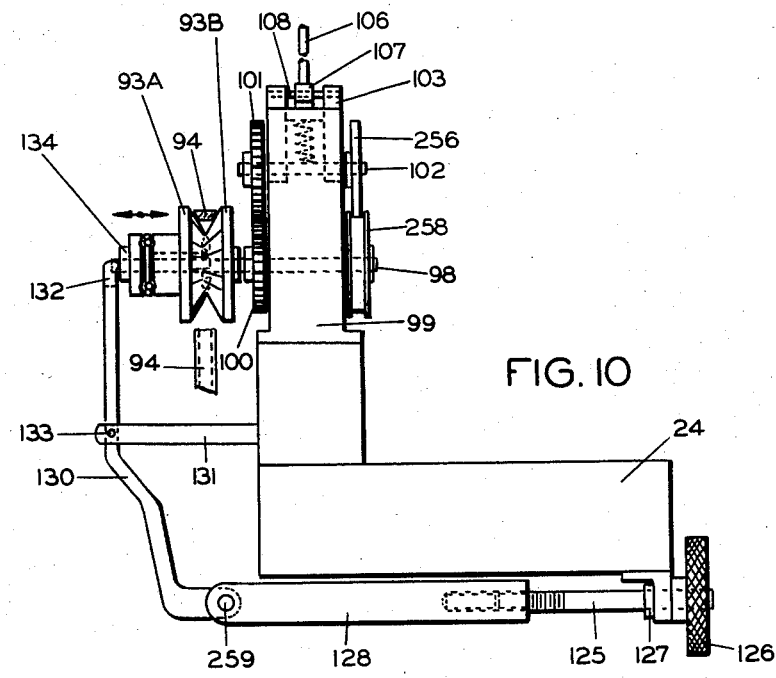
Fig. 10 is an enlarged detail view viewed from the right side of Fig. 8.
Figure 11:
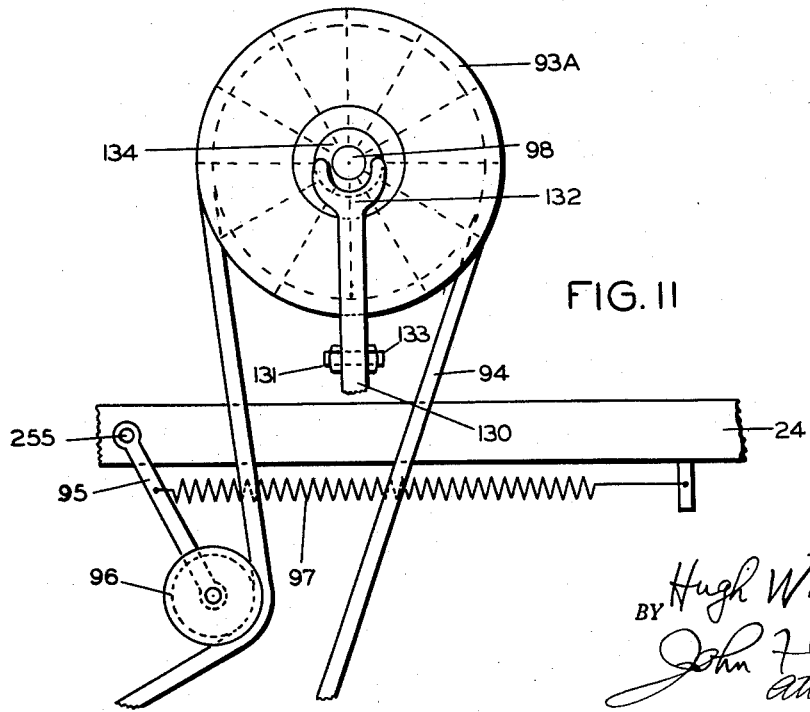
Fig. 11 is an enlarged detail view of the mechanism for controlling the ribbon feed and viewed from the left of Fig. 10.

For this, there is provided a shaft 125 which has secured on one end thereof a knob 126 to permit manual rotation of the shaft 125. The shaft 125 is mounted in horizontal position beneath the table 122 in a bearing 127 as illustrated in Fig. 10. The other end of the shaft 125 is threaded into bifurcated link 128 that has secured in the arms thereof a pin 259. A bent lever 130 has its inner end pivoted on pin 259. An intermediate portion of said lever 130 is pivoted on a pin 133 that is secured between the slotted end of an arm 131 which is secured to block 99, as illustrated in Figs. 10 and 11, as illustrated in Figs. 8 and 11, the upper end 132 of lever 130 is forked. The forked end 132 is forced against a bearing 134. As illustrated in Fig. 10, the pulley 93 comprises two sections, 93A and 93B. The outer section 93A is a free sliding section being secured on a free sliding bearing connected to bearing 134. The inner section 93B is rigidly connected to shaft 98. By turning knob 126 in a direction to cause the free-sliding section 93A to move inwardly towards section 93B, the force on belt 94 is increased and therefore the speed of shaft 98 and consequently the feed of ribbon 109 decreases. Conversely moving handle 126 to cause section 93A to move away from section 93A results in a speed-up of shaft 98 and consequently of the feed-in of the ribbon 109.

Figure 4:
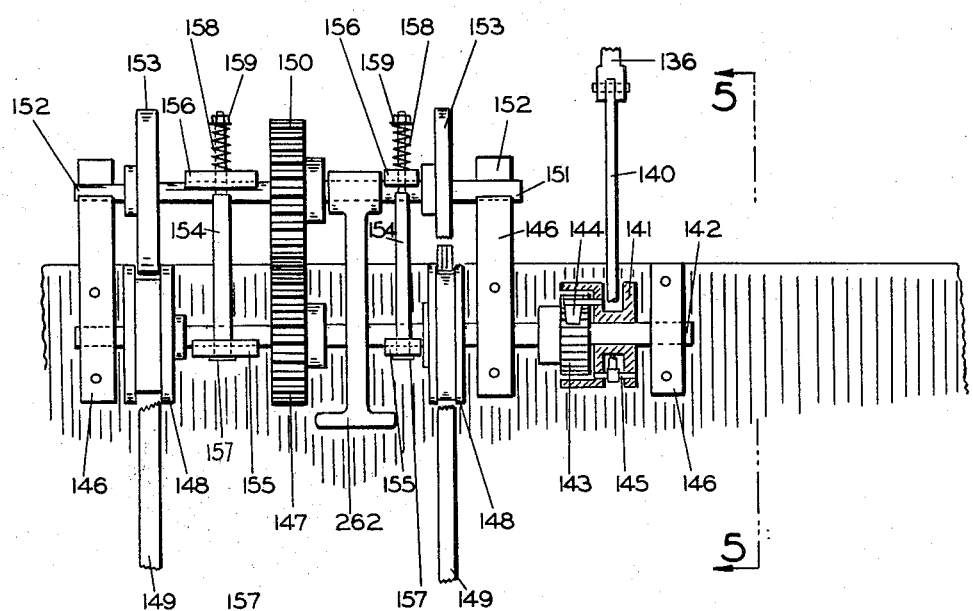
Fig. 4 is an enlarged detail view in elevation, of the mechanism for feeding the reinforcing strips into the device.
Figure 5:
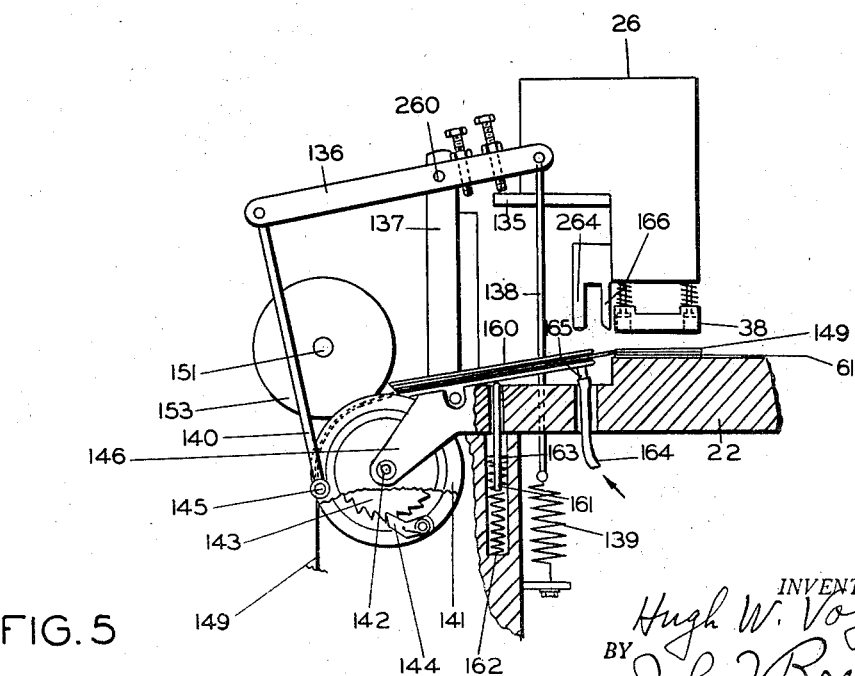
Fig. 5 is a transverse sectional view taken substantially on the line 5—5 of Fig. 4 and looking in the direction of the arrows.

The rearward end of the head 26 has a rearwardly extending extension 135, as illustrated in Fig. 5. Said extension 135 engages beneath lever 136, illustrated in Figs. 4 and 5. The lever 136 is pivoted on a pin 260 that is secured in the upper end of a vertically disposed bracket 127 which is rigidly secured to the table 22. An elongated stem member 138 is secured adjacent the inner end of the lever 136 and reciprocates in an aperture in the table 22. The end of the stem 138 is connected to an expansion spring 139 which is fastened or connected to the frame 10, as illustrated in Fig. 5. As the head 26 reciprocates, lever 136 rocks about the pin 260. A depending arm 140 is pivotally connected to the outer end of the lever 136. The lower end of the arm 140 is secured about a pin 145 which is rigidly secured to a casing 141. Casing 141 is journalled about a shaft 142 that is journalled in three spaced brackets or extensions 146 extending outwardly from the table 22. A ratchet 143 is securely mounted on the shaft 142. A spring pressed dog 144 is rigidly secured in the casing 141, as illustrated in Figs. 4 and 5, and operably engages ratchet 143 as arm 140 moves upwardly. Therefore, as the head 26 reciprocates, the shaft 142 rotates intermittently.

A gear 147 is rigidly secured on an intermediate portion of the shaft 142. The gear 147 meshes with a gear 150 that is secured to a shaft 151, whereby the intermittent rotational force of shaft 142 is transmitted to shaft 151. The shaft 151 is journalled in recesses 152 in a pair of brackets or extensions 146 as illustrated in Fig. 4. The shaft 142 has rigidly secured thereon a pair of grooved wheels 148 that are horizontally spaced from each other and positioned on opposite sides of the gear 147. The shaft 151 carries a pair of discs 153, the rims of which engage in the grooves of the wheels 148 respectively to intermittently feed a pair of transverse reinforcing strips 149 on to pivoted tracks 160, only one of which is shown in Fig. 5. A plurality of lower bearing blocks 155 are held against the shaft 142. A plurality of upper bearing elements 156 bear against the upper shaft 151. A plurality of pins 154 extend between said upper and lower bearing elements and are secured to the lower bearing elements by nuts 157, as illustrated in Fig. 4. Said pins extend through apertures in the upper bearing elements and have springs 158 mounted about the upper ends thereof. A nut 159 threaded on the upper end of each of the pins 154 secure the springs 158, respectively at desired tension against the respective bearing element 156. A handle 262 pivotally secured about the shaft 151 provides the means for pulling said shaft 151 from the recesses 152 in which said shaft is journalled as illustrated in Fig. 4. The foregoing construction provides the means for quickly and easily inserting the transverse reinforcing strips 149 into the feeding means therefor and for adjusting any twisting or entanglement thereof in the instant device.

To actuate each of the pivoted tracks 160 there is provided a pin 161, as illustrated in Fig. 5. Each pin 161 carries a boss 163 against which the respective spring 163 abuts. Each spring 163 is seated in an opening or aperture in frame 10 against which the lower end thereof engages. A conduit 164 communicatively connected with a glue reservoir 173, which is mounted on frame 10, as illustrated in Fig. 1, delivers glue or a suitable adhesive from reservoir 173 to a nipple 165 which is secured adjacent the end of each of the tracks 160. A pair of cutting dies 166, and a pair of bosses 264, only one of each of which is shown if Fig. 5, are carried on the casting 34 and as the head 26 moves downwardly each of the bosses 264 forces a respective track 160 to pivot downwardly as the dies 166 are each severing a segment of the reinforcing tape which has passed over the nipple 165 and had glue applied to the under surface thereof. As the dies 166 move into the severing position the presser feet 38 and 39 engage the severed strips to hold and secure them on the tape 61.

A sprocket 167 is illustrated in Fig. 7 as being secured to the shaft 16. The rotational force of the shaft 16 is transmitted from the sprocket 167 to a sprocket 169 (shown in dotted lines in Fig. 12) through chain 168. A bracket 170 secured by fasteners 171 to the table 22 as illustrated in Fig. 12 carries an idler 172 that engages the chain 168, as illustrated in Fig. 12.

Figure 12:
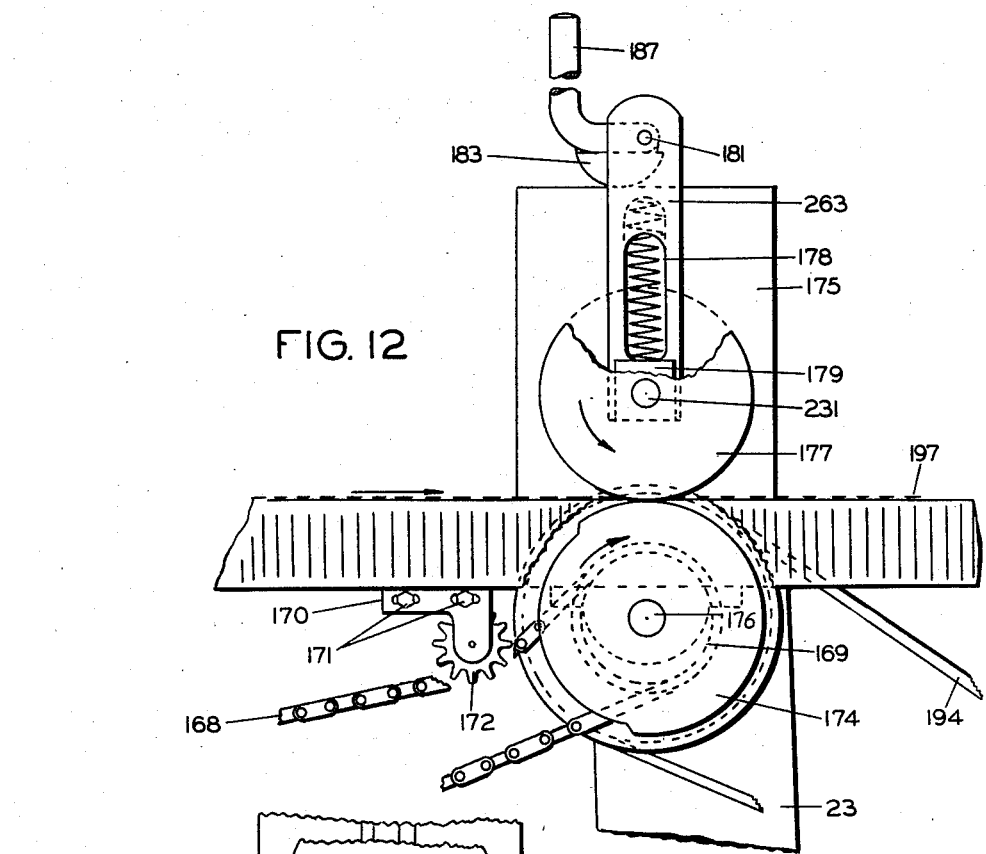
Fig. 12 is an enlarged detail view in elevation, illustrating the mechanism for pulling the assembled parcel carriers through the device, part being broken away for the purpose of illustration.
Figure 13:
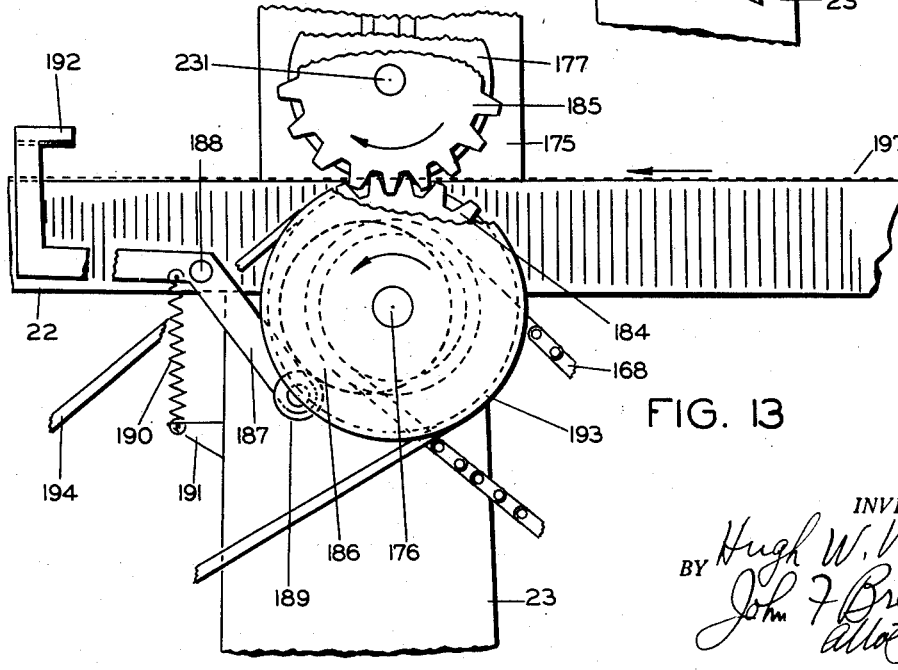
Fig. 13 is an enlarged detail view in elevation, illustrating the power transmission means associated with the pulling of the assembled parcel carriers through the device.

The sprocket 169 is secured on a shaft 176 that is journalled adjacent one of the supports 23 as illustrated in Figs. 1, 2, and 12. As illustrated in Fig. 13, a gear 184 is rigidly secured on the opposite end of shaft 176. The gear 184 is meshable with the gear 185 that is secured on a shaft 231 so that when the gears 184 and 185 are enmeshed, the shaft 231 is caused to rotate. The shaft 176 carries a cam 174, illustrated in Fig. 12. The shaft 231 carries a disc 177 that engages the raised portion of the cam 174 when the gears 184 and 185 are enmeshed. The finished parcel carriers engage between the raised portion of the cam 174 and the disc 177 to be intermittently drawn along the surface of the table 22.

The shaft 231 is journalled in a bearing 179 that is rigidly secured in the lower end of an arm 263 that is slidably mounted in a block 175. The block 175 is rigidly secured to the surface of the table 22 and extends upwardly therefrom, as illustrated in Fig. 12. The upper end of the arm 263 is mounted about a pin 181 which has secured thereto a handle 182 that carries at its lower end a rounded boss 183 engaging the top of the top of the block 175. A compression spring 178, at its lower end bears on bearing 179, and at its upper end bears against the block 175. By virtue of the foregoing arrangement the shaft 231 and the gear 185 and disc 177 carried thereon may be operably disconnected from the other moving components to stop the pull of the completed parcel carriers by moving handle 187 downwardly. In other words, as the handle 182 is moved downwardly the arm 263 and the shaft 231 will move upwardly carrying with it gear 185 and disc 177.

As illustrated in Fig. 13, an eccentrically mounted disc 186 is rigidly secured on the shaft 176. An angularly bent pivoted lever 187 is pivoted on the pin 188 extending outwardly from the table 22 of the device. A wheel 189 is pivotally secured in the lower end of said lever 187 and engages said disc 186. A tension spring 190 has its lower end connected to an extension 191 of the frame and the upper end thereof is connected to a lug extending outwardly from lever 187. The upper end of the lever 187 carries a transversely extending clamping element 192 that will be forced to intermittently engage the completed drawn parcel carrying strip when the head 26 is in lowered position.

A pulley 193 that is rigidly secured on the shaft 176, as illustrated in Fig. 13, transmits its rotational force through belt 194, illustrated in Figs. 1, 2, and 13 to a pulley 196 that is secured on a shaft 195. Shaft 195 is journalled in the upwardly extending arm 21 as illustrated to the left of Fig. 2. The finished parcel carrier is continuously wound in a roll under continuous drive transmitted to the belt 194.

Inasmuch as the movement of the finished parcel carriers from the end of the table 22 is intermittent, means are provided whereby the finished parcel carrier can be continuously wound in a roll 197. Such means comprise a rack 198, illustrated at the right of Fig. 1. The rack has a plurality of supports or frame members 199, shown as being two in number in Fig. 1 of the drawings. The rack has an outwardly extending extension or arm 200 in which a pin 201 carrying a roller 202 is secured. Additionally, there is mounted in the upper end of the rack 198 another roller 203 which is pivoted in the upper frame member 205. A roller 204 is rotatably mounted in the lower frame member 208 which also carries a pair of spaced apart rotatable spools 207 and 210. The upper frame member carries a pair of spools 206 and 209. A spool 211 is rotatably mounted on the forward frame member 199 as illustrated in the drawings. The finished parcel carrier is directed in a path below a roller 212 which is journalled at the end of elongated arm 213, as illustrated in Figs. 1 and 2, thence upwardly across the roller 202, thence across the roller 203 at the back of the frame of the rack 198, thence downwardly under the roller 204, thence over the rollers 206, 207, 209, 210, and 211 on to a roll 197, as illustrated in Fig. 1, in the direction of the arrows.

An arm 213 is pivoted to a bracket 214 which is carried by the frame 10 as illustrated in Figs. 1 and 2. A switch 215, which is diagrammatically illustrated, as being in a switch box mounted on the frame 10, is provided with a switch arm 216. A depending lug 217 is carried on the arm 213 and is adapted to and does engage the switch arm 216 when the finished parcel carrier breaks to thereby open the circuit through which the motor 13 receives its energy. An expansion spring 226 connected at its opposite ends to the frame 10 and to the arm 213 permits a smooth bobbing of the arm 213 as long as the roller 212 is supported.

A disc 218, illustrated at the left in Fig. 2, is secured on the shaft 195, a brake carried on brake arm 219 engages the disc 218. The brake arm 219 is rigidly secured on a pin 220 that is pivotally supported on extension 19 of the frame 10. An arm 221 has one end thereof secured on side pin 220. The other end of said arm 221 is apertured and an arm 222 extends upwardly through the apertures and the arm 221. The arm 222 has rigidly secured thereto a boss 223. A compression spring 224 brings its pressure to bear against the boss 223 and the arm 221, as illustrated in Fig. 2. The lower end of the arm 221 is secured to a pin 225 about which the roller 212 rotates. The end of the lever 213 is secured on the pin 225.

Should the finished parcel carrier break, the weight of the roller 212 results in engagement of the switch arm 216 with the lug 217 to thereby break the driving circuit, as aforesaid.

During normal operation of the device the amount of the loop of finished parcel carrier hanging over the end of the table 22 will determine the amount of braking action applied on the disc 218. In other words, when the clamping extension 192 is in clamping position the parcel carrier coming off the finished end of the device will cease to move. Roll 197 however, is continuously moving under the force transmitted through belt 194. As a consequence the roller 212 will be elevated forcing the arm 22 upwardly and the brake arm 219 inwardly against the disc 218, to tend to decrease the speed of the winding of the finished parcel carrier on the roll 197; and as the roller 212 drops because the parcel carrier is being fed from the end of the table 22, the brake arm will be retracted from the engagement with the disc 218 and the parcel carrier will wind more rapidly on roll 197.

Referring to Figs. 14, 15, 16, and 17, there is illustrated a selected section of the completed parcel carrier manufactured by the device with which the instant invention is concerned. The parcel carrier comprises an elongated tape 61, having one surface 227 thereof gummed as illustrated in Fig. 16. The ribbon 109 is connected at spaced apart positions to the gummed surface, as illustrated in Fig. 16. The ribbon 109 extends through the elongated slit as 230 to form the handle as illustrated in Figs. 14, 15 and 17. Reinforcing segments 149 prevent tearing of the tape 61 from the carrying force, and such segments 149 are secured to the gummed surface 227 of the tape 61 adjacent to the apertures 229 where the ribbon 109 extends from an underside to the upper side of the tape 61. The apertures 228, formed at spaced apart positions in the ribbon 109 and tape 61, provide weakened areas at which the parcel carrier can be conveniently severed. The length of parcel carrier between each successive of the apertures 228 comprises a complete parcel carrying unit. In actual practice any desired length of at least one or more parcel carrying units can be severed to provide means by which a parcel can be carried.

In Fig. 17, one parcel carrying unit is illustrated affixed to a parcel 265. The ribbon 109 that extends above the upper surface of the tape 61 provides a looped handle. The section of the paper tape 61 is secured to the parcel 265 as the result of moistening or otherwise suitably preparing the adhesive and affixing it to the parcel wrapper.

The manner in which the device operates is as follows:

The tape 61 with its gummed surface 227 facing upwardly is fed on to the surface of the table 22 beneath the applicator 79 that intermittently engages the gummed surface 227 of the gummed tape 61 substantially at a point midway between the sides of the tape 61. As the tape is intermittently drawn under the applicator, an elongated central strip thereof is made wet by said applicator. The device is so reciprocated that as cam 174 is in engagement with the wheel 177, the completed parcel carriers are drawn from the table 22. At this time head 26 is in elevated position, and the applicator 79 is in engagement with the tape 61. As the raised rim of cam disengages the wheel 177, the segment of the tape previously wetted has been moved into position below the pressure component 121, illustrated in Fig. 3. Whereupon, the head 26 descends and causes adhesion of the ribbon between two adjacent apertures 229 of different ultimate parcel carrying segments. Simultaneously the said segments of reinforcing tape 149 are severed and affixed to the gummed surface of the tape adjacent a pair of apertures 229 which are then being punched by the dies 37. At the same time, the die 35 cuts an elongated slit 230.

As the head 26 raises, the raised rim portion of cam 174 again engages the wheel 177 to draw the completed parcel carrier from left to right with respect to the illustrations of Figs. 1 and 3. This brings the aperture 229 previously punched into alignment with the holes 44 under the tines 43. The device so reciprocates that immediately before the descent of the head 26, fork 42 is tripped and plunges downwardly pulling an excess amount of ribbon 109 through the slit 230 to form a handle. As the head 26 completes its descent the fork 42 starts its upward movement.

When head 26 next moves to elevated position a finished parcel carrier section is once again drawn across the surface of table 22. Upon descent of the head again, the ribbon 109 adhered to the tape 61 between adjacent aperture 229 and the tape 61 to which said ribbon is adhered is punched substantially mid-way between apertures 229 by the die 55, to form an aperture 28. As previously described the finished parcel carrier is drawn from the edge of the table and is subsequently wound in a spool or roll 197.

As a result of the foregoing improvements, increased speeds of manufacture of the parcel carriers of 30% are achieved over conventional devices of the class described.

Inasmuch as many changes could be made in the foregoing construction, and as many variations could be proposed in the specification and claims without departing from the spirit and scope thereof, it is intended that all matter contained herein shall be considered as being illustrative and not in a limiting sense.

I claim:

1. In a device for continuously manufacturing connected severable parcel carriers having looped handles, the combination of a frame; a prime mover means; means for feeding into and pulling a tape through said frame from a ribbon supply source including a pair of ribbon feeding elements; means, including a reciprocating head, for securing portions of the ribbon to said tape and forming a handle from other portions of the ribbon, and means for accumulating the finished parcel carriers, with means for controlling the rate of ribbon feed comprising an eccentric operably connected to said prime mover means and varying the rate of ribbon feed; an adjustable pulley operably connected to said eccentric, said pulley having relatively adjustable sections, said pair of ribbon feeding elements operably connected to said pulley, the speed of rotation of said ribbon feeding elements being determined by the position of said eccentric; a manually controllable lever normally pressing against one of said adjustable pulley sections, and manually operable means connected to said lever, regulating the pressure on said lever, whereby the speed of rotation of said pulley can be selectively controlled, a pair of opposed shafts, said ribbon feeding elements being secured to said shafts, and means for separating one of said shafts from the other thereof.

2. In a device for continuously manufacturing connected severable parcel carriers having looped handles, the combination of a frame; a prime mover means; means for feeding into and pulling a tape through said frame from a tape supply source; means for feeding into and drawing a ribbon through said frame from a ribbon supply source; means, including a reciprocable head, for securing portions of the ribbon to said tape and forming a handle from other portions of the ribbon, and means for accumulating the finished parcel carriers, with means for controlling the rate of ribbon feed comprising an eccentric operably connected to said prime mover means, a pulley; a belt operably connected to and connecting said eccentric and said pulley, whereby the speed of each rotation of said pulley is varied; a first shaft, said pulley being mounted on said first shaft, said pulley having a section secured to said first shaft and a free sliding section thereon; a second shaft operably connected to said first shaft; opposed gripping means secured to said first and second shaft, and adapted to grip and feed the ribbon; manually operable means operably connected to said second shaft and adapted to elevate said second shaft to thereby cause said gripping means to disengage the ribbon being fed; lever means normally pressing against said free sliding pulley section, and means connected to said lever means whereby the pressure on said free sliding section may be selectively varied.

3. A device for manufacturing connected severable parcel carriers having looped handles, said device having a frame, prime mover means, means for feeding a tape through said frame, means for feeding a ribbon through said frame, a reciprocable head operably connected to said prime mover means, means on said head for securing portions of said ribbon to said tape, plunging means mounted on said head for forcing portions of said ribbon through said tape to form handles for the parcel carriers, and having means for intermittently drawing the finished parcel carriers under said head, and being characterized by a rotatable cam operably connected to said prime mover means; a wheel operably connected to said prime mover means, said wheel and said cam being adapted to intermittently grip and pull the finished parcel carriers; a shaft, said wheel being secured on said shaft; spring means bearing against said shaft, and manually operable elevating means connected to said shaft whereby said wheel can be selectively moved to non-rotating position.

4. A device for manufacturing connected severable parcel carriers having looped handles, said device having a frame, prime mover means, means for feeding a tape through said frame, means for feeding a ribbon through said frame, a reciprocable head operably connected to said prime mover means, means on said head for securing portions of said ribbon to said tape, plunging means mounted on said head for forcing portions of said ribbon through said tape to form handles for the parcel carriers, and having means for intermittently drawing the finished parcel carriers under said head, and being characterized by a rotatable cam operably connected to said prime mover means; a first shaft, said cam being secured on said first shaft; a gear and an eccentric secured on said first shaft; a second gear normally meshing with said first gear; a second shaft, said second gear being secured on said second shaft; a wheel secured on said second shaft and being adapted to intermittently grip and pull the parcel carriers with said cam as said second shaft is rotating; spring means bearing against said second shaft; manually operable means operably connected to said second shaft for elevating said second shaft against the action of said spring, and a clamp operably connected to said eccentric and adapted to intermittently clamp the finished parcel carriers against said frame.

5. A device for manufacturing connected severable parcel carriers having looped handles, said device having a prime mover means including a switch therefor, means for feeding a tape through said frame, means for feeding a ribbon through said frame, a reciprocable head operably connected to said prime mover means, means on said head for securing portions of said ribbon to said tape, plunging means mounted on said head for forcing other portions of said ribbon through said tape to form handles for the parcel carriers, means operably connected to said prime mover means for intermittently drawing the finished parcel carriers substantially through said frame, and having driven spool rotatable means operably connected to said prime mover means for accumulating the finished parcel carriers, and being characterized by an elongated arm pivotally connected to said frame; an expansion spring connected to said arm and said frame; a roller rotatably mounted in the free end of said arm, and a brake mechanism operably connected to said arm and engaging said spool, said arm being engageable with said switch to cause stopping of said prime mover means, the height of said arm governing the speed of said driven rotatable means.

6. A device for manufacturing connected severable parcel carriers having looped handles, said device having a prime mover means including a switch therefor, means for feeding a tape through said frame, means for feeding a ribbon through said frame, a reciprocable head operably connected to said prime mover means, means on said head for securing portions of said ribbon to said tape, plunging means mounted on said head for forcing other portions of said ribbon through said tape to form handles for the parcel carriers, means operably connected to said prime mover means for intermittently drawing the finished parcel carriers substantially through said frame, and being characterized by a driven parcel carrier spool supported on an extension of said frame and being spaced from the remainder of said frame, said spool being operably connected to said prime mover means, an elongated arm, said arm, at one end thereof, being pivotally connected to said frame, said arm being adapted to engage said switch to stop said prime mover means, a roller mounted in the free end of said arm and being normally supported by the parcel carriers, a rod operably connected to said arm and moving therewith, a brake mechanism including a lever operably connected to said rod and normally bearing on said spool whereby the position of said arm determines the speed of winding of said spool.

References Cited in the file of this patent

UNITED STATES PATENTS

| | | |
|---|---|---|
| 953,918 | Oehring | Apr. 5, 1910 |
| 954,751 | Mann | Apr. 12, 1910 |
| 1,235,805 | Jennings | Aug. 7, 1917 |
| 1,637,658 | Rose | Aug. 2, 1927 |
| 1,662,660 | Clay | Mar. 13, 1928 |
| 1,696,638 | Kallenbaugh | Dec. 25, 1928 |
| 1,714,143 | Schramm | May 21, 1929 |
| 1,790,559 | Swift | Jan. 27, 1931 |
| 1,941,597 | Cavagnaro | Jan. 2, 1934 |
| 1,968,166 | Paythian et al. | July 31, 1934 |
| 2,095,139 | Kind | Oct. 5, 1937 |
| 2,137,913 | Kind | Nov. 22, 1938 |
| 2,164,935 | Meyer | July 4, 1939 |
| 2,292,511 | Ferm | Aug. 11, 1942 |
| 2,293,433 | Gautier | Aug. 18, 1942 |
| 2,451,833 | Koch | Oct. 19, 1948 |
| 2,454,844 | Sharpe | Nov. 30, 1948 |
| 2,521,691 | Corlett | Sept. 12, 1950 |
| 2,570,176 | Wittel | Oct. 2, 1951 |
| 2,638,821 | Baumgartner | May 19, 1953 |

FOREIGN PATENTS

| | | |
|---|---|---|
| 437,881 | Great Britain | Nov. 6, 1935 |